(12) United States Patent
Campbell et al.

(10) Patent No.: US 9,223,595 B2
(45) Date of Patent: Dec. 29, 2015

(54) MECHANISM FOR COMPARISON OF DISPARATE DATA IN DATA STRUCTURES

(71) Applicant: The MathWorks, Inc., Natick, MA (US)

(72) Inventors: Andrew T. Campbell, Medway, MA (US); Gerhard P. Stoeckel, Natick, MA (US); David M. Saxe, Stow, MA (US); Gregory V. Aloe, Jamaica Plain, MA (US); Ajay B. Puvvala, Brighton, MA (US); David Hruska, Chestnut Hill, MA (US)

(73) Assignee: The MathWorks, Inc., Natick, MA (US)

( * ) Notice: Subject to any disclaimer, the term of this patent is extended or adjusted under 35 U.S.C. 154(b) by 73 days.

(21) Appl. No.: 13/705,647

(22) Filed: Dec. 5, 2012

(65) Prior Publication Data

US 2014/0156689 A1 Jun. 5, 2014

(51) Int. Cl.
*G06F 17/30* (2006.01)
*G06F 9/455* (2006.01)

(52) U.S. Cl.
CPC .......... *G06F 9/455* (2013.01); *G06F 17/30985* (2013.01)

(58) Field of Classification Search
CPC .................. G06F 17/30; G06F 17/30985
USPC ................................................ 707/758
See application file for complete search history.

(56) References Cited

U.S. PATENT DOCUMENTS

| 5,729,659 | A  | * | 3/1998 | Potter ................ 704/270 |
| 6,049,799 | A  | * | 4/2000 | Mangat et al. ............ 1/1 |
| 6,348,881 | B1 | * | 2/2002 | Buer ................... 341/51 |
| 2005/0002473 | A1 | * | 1/2005 | Kloper et al. .......... 375/316 |
| 2008/0019464 | A1 | * | 1/2008 | Kloper et al. .......... 375/340 |
| 2012/0096310 | A1 | * | 4/2012 | Varanasi et al. ......... 714/15 |

\* cited by examiner

*Primary Examiner* — Joshua Bullock
(74) *Attorney, Agent, or Firm* — Harrity & Harrity, LLP

(57) ABSTRACT

A device receives a first result that includes first data, and a second result that includes second data, and determines whether a comparator supports the first data and the second data. When the comparator supports the first data and the second data, the device utilizes the comparator to select comparison logic for the first data of the first result and for the second data of the second result, compares the first result and the second result, using the selected comparison logic, to determine whether the first result is equivalent to the second result, and outputs or stores the determination of whether the first result is equivalent to the second result.

20 Claims, 10 Drawing Sheets

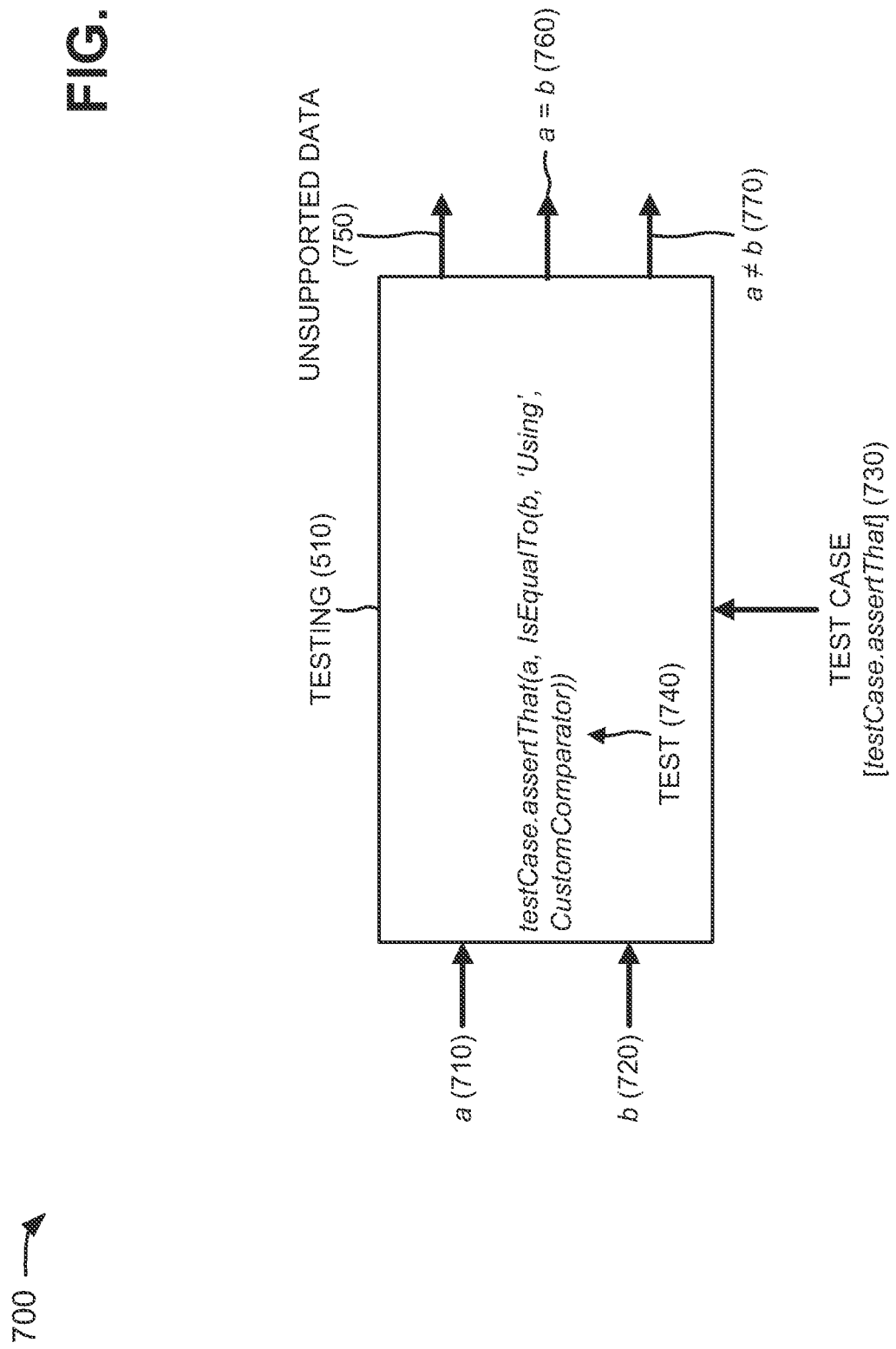

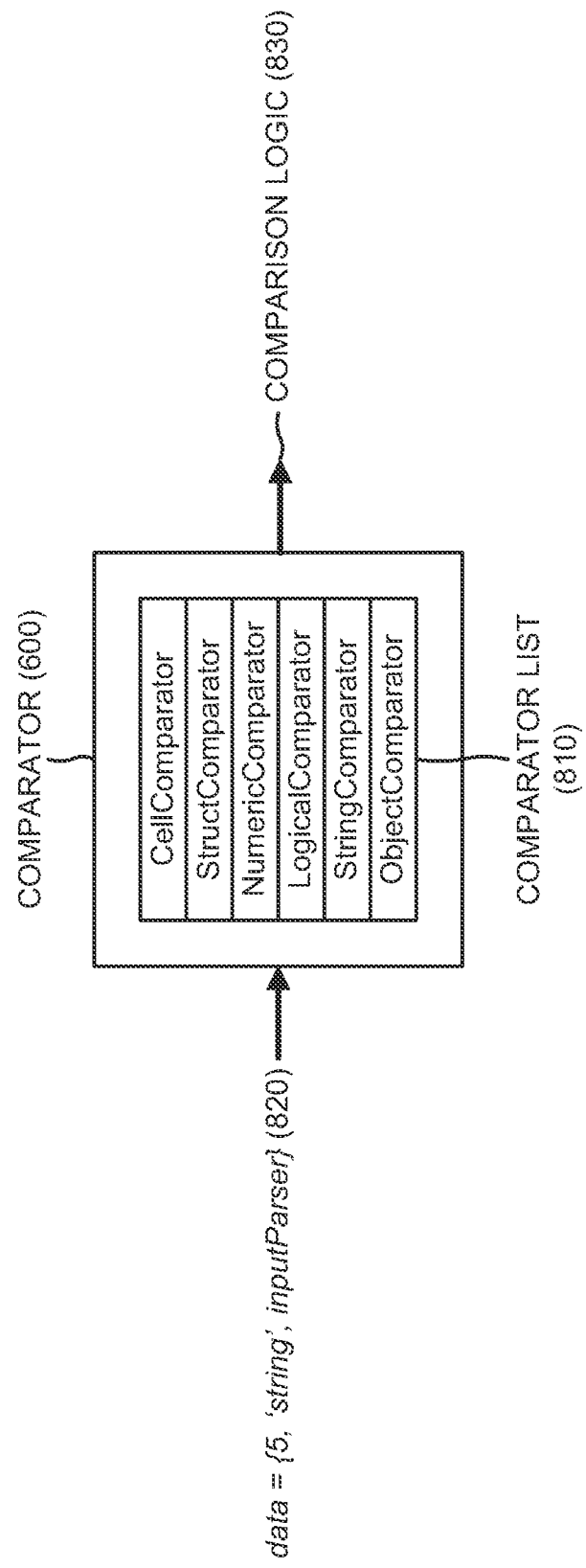

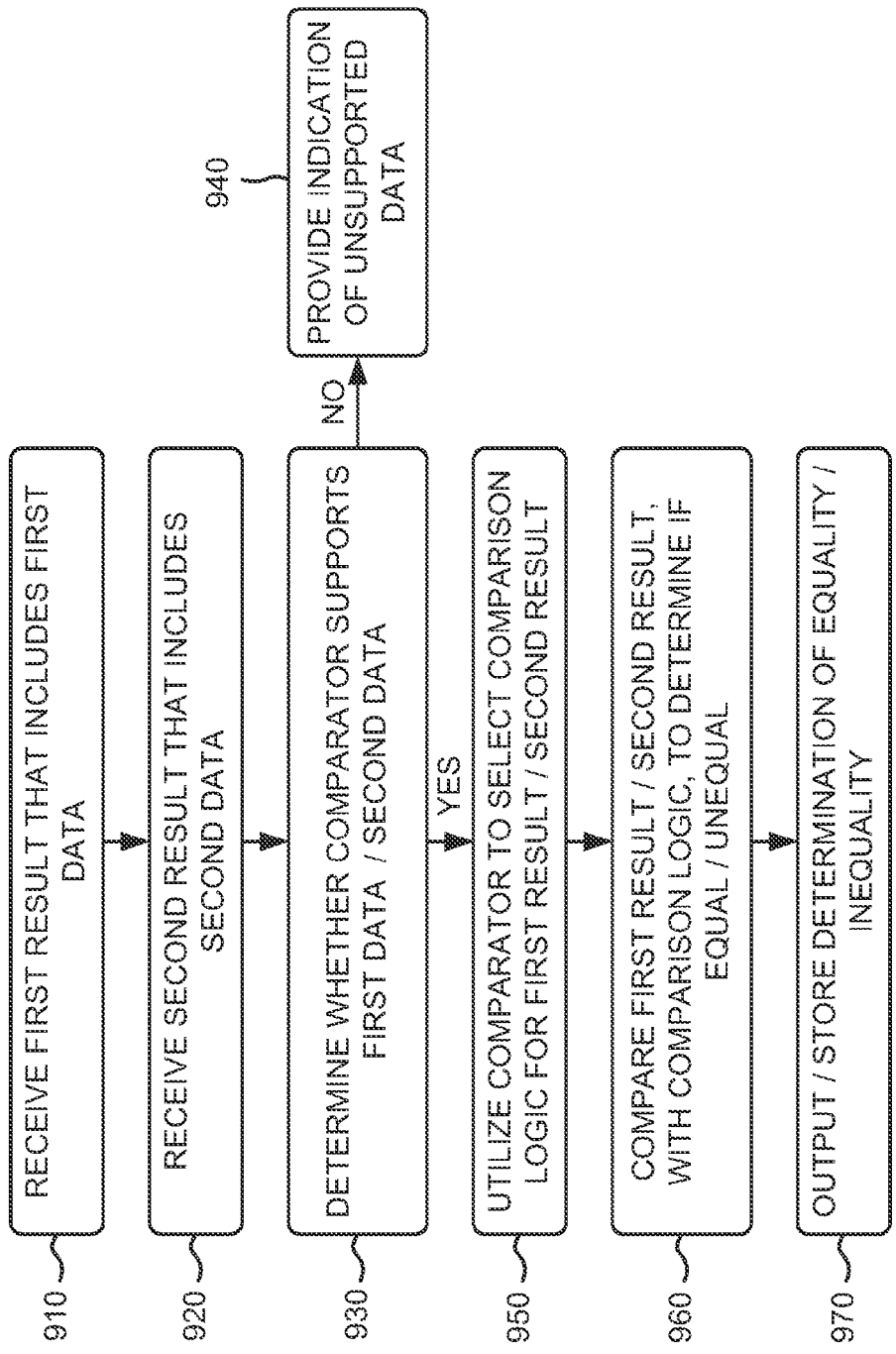

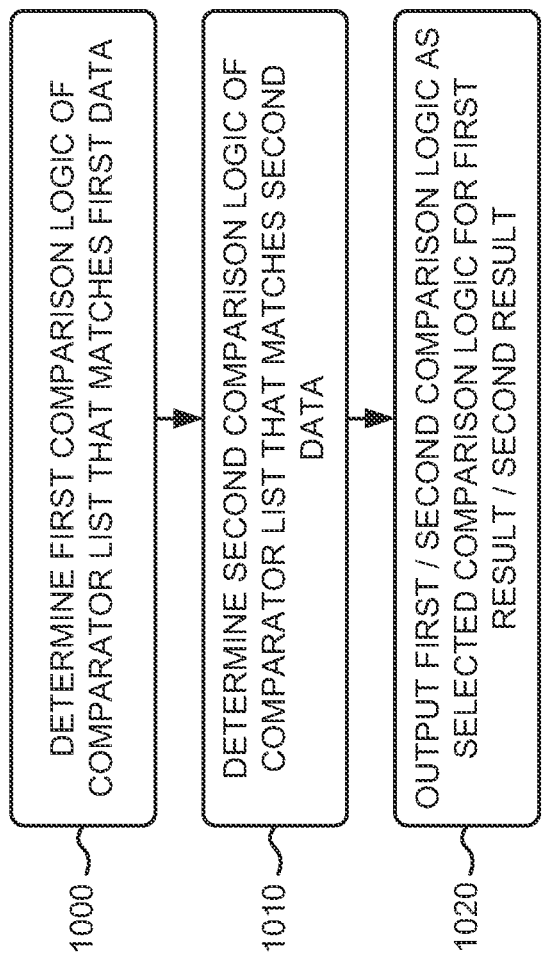

MECHANISM FOR COMPARISON OF DISPARATE DATA IN DATA STRUCTURES

BRIEF DESCRIPTION OF THE DRAWINGS

The accompanying drawings, which are incorporated in and constitute a part of this specification, illustrate one or more implementations and, together with the description, explain these implementations. In the drawings:

FIG. 7 is a diagram of example operations capable of being performed by the testing component;

FIG. 8 is a diagram of example operations capable of being performed by a comparator component of the testing component; and FIGS. 9 and 10 are flow charts of an example process for comparing disparate data in arbitrarily complex data structures.

DETAILED DESCRIPTION

The following detailed description refers to the accompanying drawings. The same reference numbers in different drawings may identify the same or similar elements.

A technical computing environment (TCE) may provide a computing environment that allows users to perform tasks related to disciplines, such as, but not limited to, mathematics, science, engineering, medicine, business, etc., more efficiently than if the tasks were performed in another type of computing environment, such as an environment that requires the user to develop code in a conventional programming language, such as C++, C, Fortran, Pascal, etc. In one example, a TCE may include a dynamically-typed programming language (e.g., the M language, a MATLAB® language, a MATLAB-compatible language, a MATLAB-like language, etc.) that can be used to express problems and/or solutions in mathematical notations.

Code generated by the TCE may be tested to determine whether the code will function properly (e.g., when executed). In a simple example, the code may be output as a simulation and an executable. The simulation code may be executed to generate simulation results, and the executable code may be executed to generate executable results. The simulation results and the executable results may be tested to determine whether the simulation results are equivalent to the executable results. However, comparing such results may be difficult when the results include disparate data in complex data structures.

OVERVIEW

Systems and/or methods described herein may compare disparate data in arbitrarily complex data structures in order to determine whether the data structures are equivalent (e.g., pass or fail a qualification test). In one example, the systems and/or methods may provide a comparator application programming interface (API) that enables a tester of program code to compare complex data structures (e.g., cell arrays, structure arrays, etc.). The data structures may include many different types of data and each data type may require different methods of comparison. The single comparator API may recursively compare all elements of a data structure so that each element may utilize comparison logic that is appropriate for that element.

Figure 1:
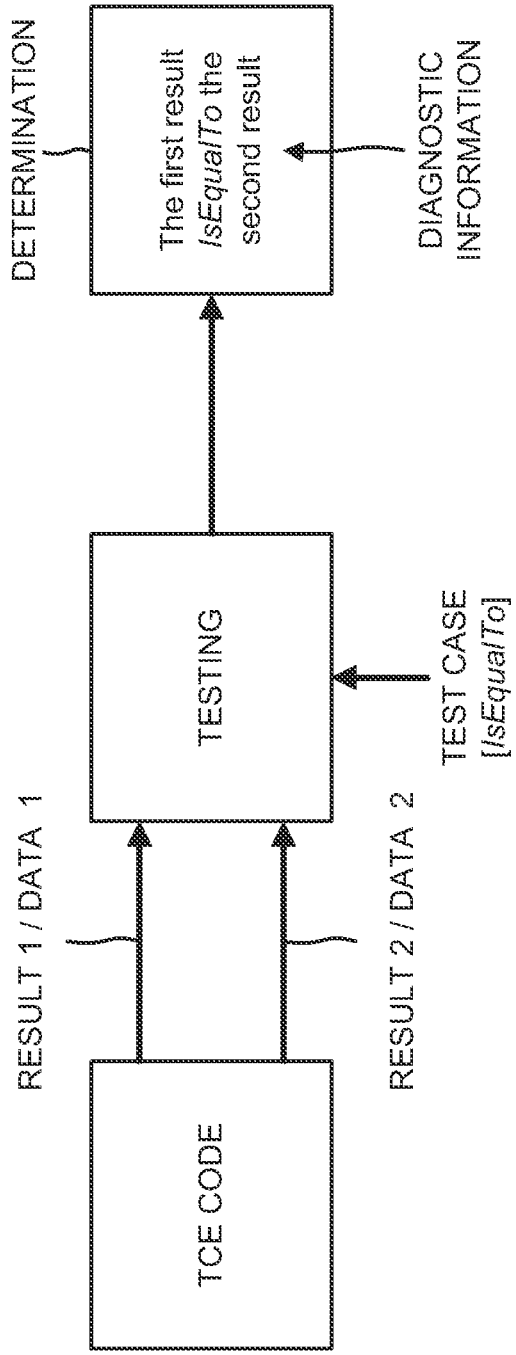
FIG. 1 is a diagram of an overview of an example implementation described herein.

FIG. 1 is a diagram of an overview of an example implementation described herein. As shown in FIG. 1, a computing environment, such as a technical computing environment (TCE), may include a testing component. The testing component may receive results generated by TCE code, and may test the results to determine whether the code functions properly.

As further shown in FIG. 1, the testing component may receive results generated by TCE code. The TCE code may include text-based code that may require further processing to execute, binary code that may be executed, text files that may be executed in conjunction with other executables, etc. In one example, the TCE code may be executed to generate a first result that includes first data. The TCE code may again be executed to generate a second result that includes second data. In one example, the first result may be generated by a simulation version of the TCE code, and the second result may be generated by an executable version of the TCE code. The first data and the second data may be the same type or different types, and may include floating point values, cell arrays, structure arrays, simulation output data, etc. The testing component may receive a test case to be applied to the first result and the second result. For example, the test case may include a test (e.g., IsEqualTo) to determine whether the first result is equivalent to the second result.

The testing component may determine whether a comparator, of the testing component, supports the first data and the second data. If the comparator does not support the first data and/or the second data, the testing component may provide (e.g., display) an indication of an unsupported data in the first result and/or the second result. If the comparator supports the first data and the second data, the testing component may utilize the comparator to select comparison logic that is appropriate for the first data of the first result and the second data of the second result.

In one example implementation, the comparator may include a set (e.g., a list) of comparison logic that may be used to support different data structures. For example, the list may include comparison logic for cell arrays, structure arrays, numeric data, logical data, string data, object data, etc. The testing component may determine first comparison logic of the list that matches the first data, and may determine second comparison logic of the list that matches the second data. The comparator may output the first comparison logic as the selected comparison logic that is appropriate for the first data of the first result. The comparator may output the second comparison logic as the selected comparison logic that is appropriate for the second data of the second result.

The testing component may compare the first result and the second result, using the selected comparison logic and based on the test case, to determine whether the first result is equal to the second result. The testing component may output a determination of whether the first result is equal to the second result. If the first result equals the second result, the testing component may output (e.g., display) and/or store diagnostic information indicating the equivalence of the first result and the second result. For example, as shown in FIG. 1, the diagnostic information may state: "The first result IsEqualTo the second result." If the first result does not equal the second result, the testing component may output (e.g., display) and/or store diagnostic information indicating the nonequivalence of the first result and the second result.

The terms "code" and "program code," as used herein, are to be used interchangeably and are to be broadly interpreted to include text-based code (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

Example Environment Arrangement

Figure 2:
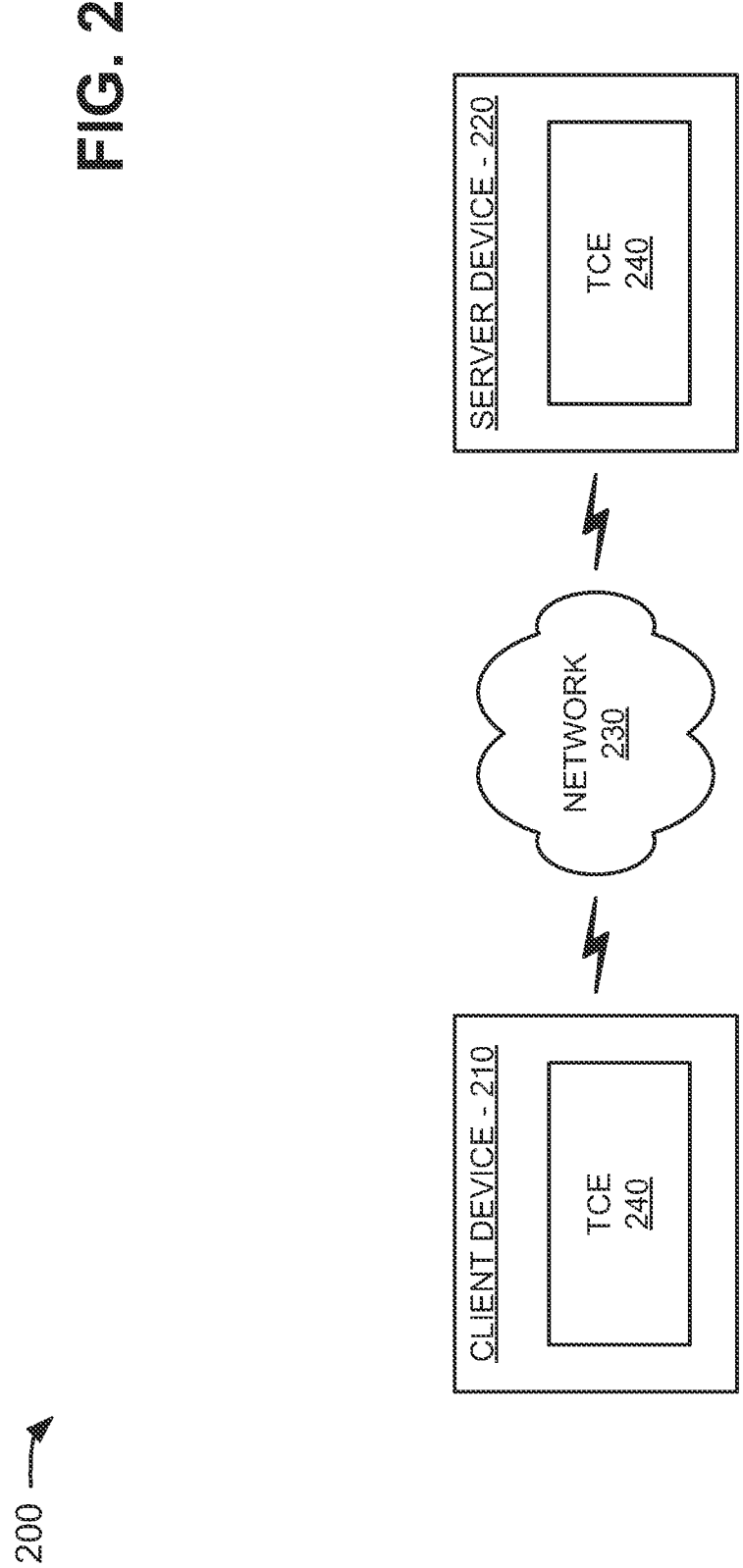
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
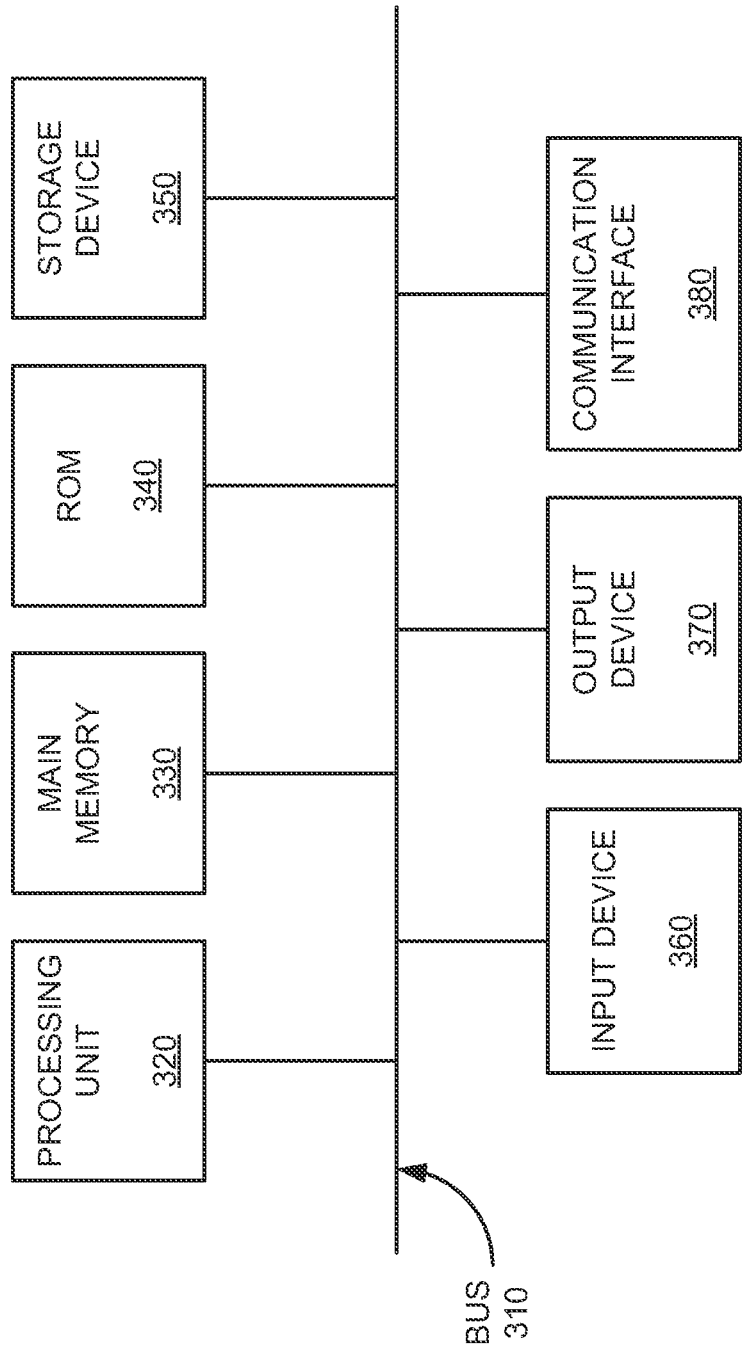
FIG. 3 is a diagram of example components of one or more of the devices of the environment depicted in FIG. 2.

FIG. 3 is an example diagram of a device 300 that may correspond to one or more of the devices of environment 200.

As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
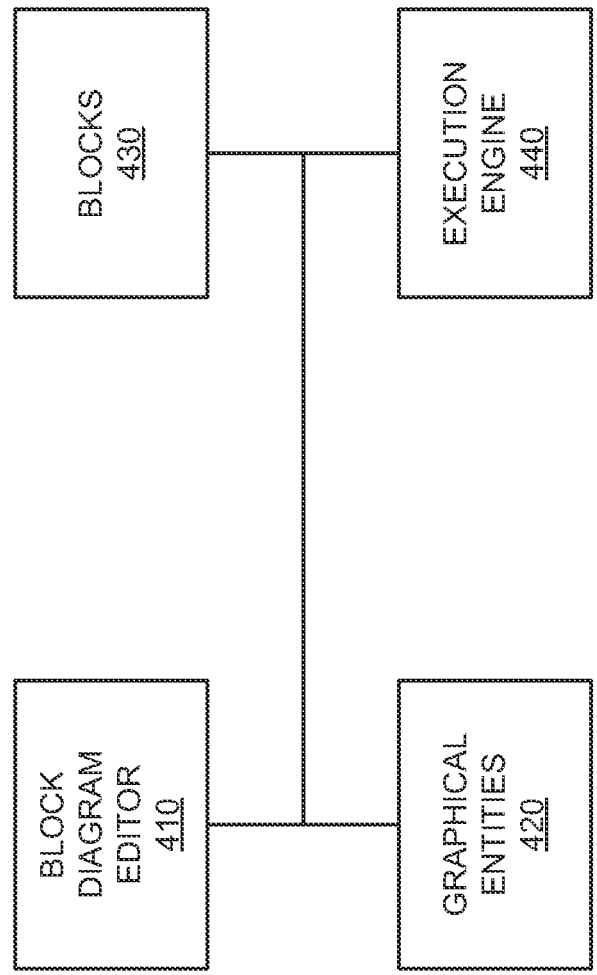
FIG. 4 is a diagram of example functional components of a technical computing environment (TCE) that may be used by one or more of the devices of the environment depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities my include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
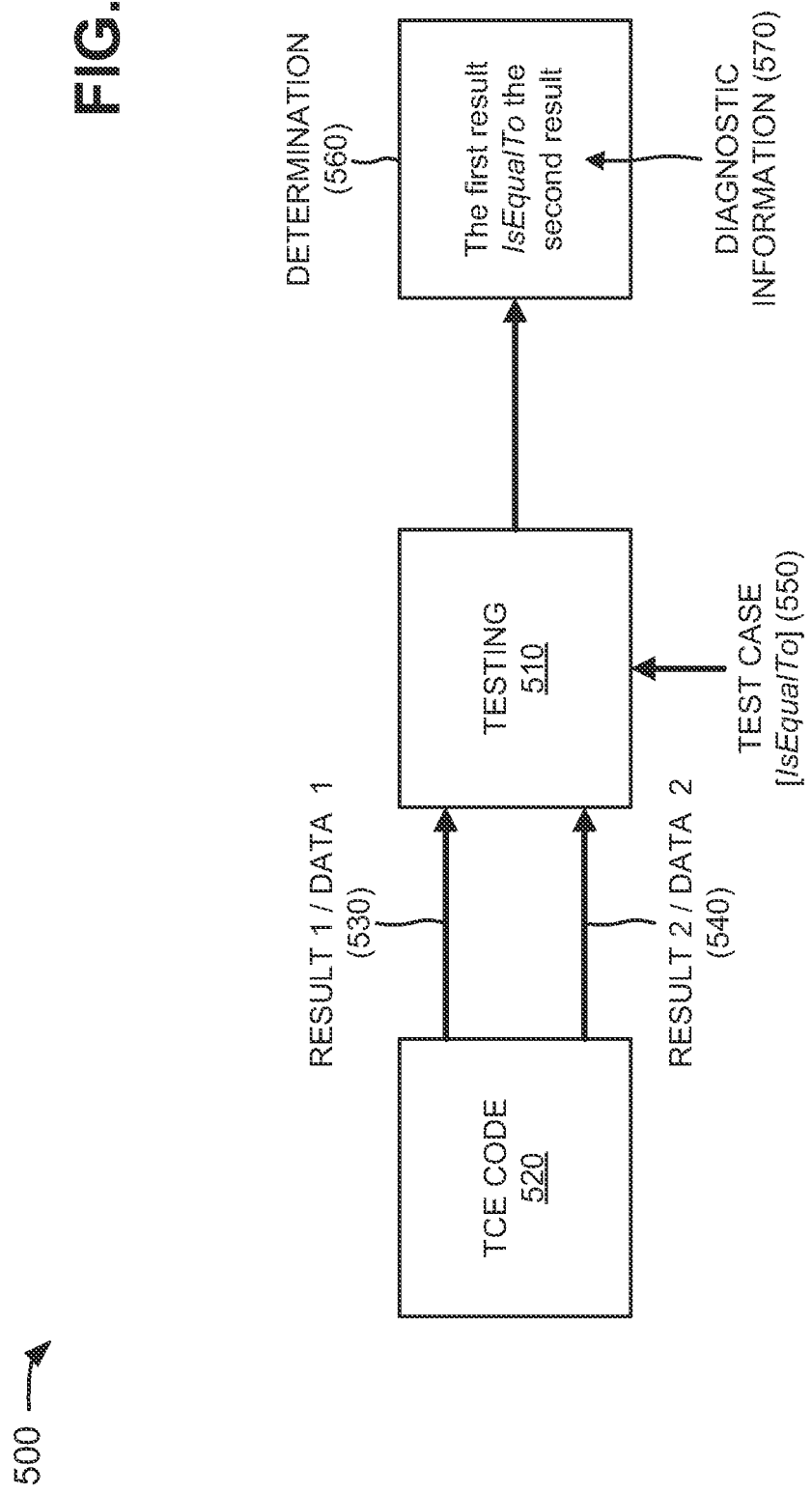
FIG. 5 is a diagram of example operations capable of being performed by the TCE.

FIG. 5 is a diagram of example operations 500 capable of being performed by TCE 240. TCE 240 may include the features described above in connection with, for example, one or more of FIGS. 1-4. As illustrated in FIG. 5, TCE 240 may include a testing component 510. The functions described in connection with testing component 510 may be performed by one or more components of device 300 (FIG. 3) and/or by one or more devices 300.

As further shown in FIG. 5, testing component 510 may receive results generated by TCE code 520. TCE code 520 may include text-based code that may require further processing to execute, binary code that may be executed, text files that may be executed in conjunction with other executables, etc. In one example, TCE code 520 may be executed to generate a first result 530 that includes first data. TCE code 520 may again be executed to generate a second result 540 that includes second data. In one example, first result 530 may be generated by a simulation version of TCE code 520, and second result 540 may be generated by an executable version of TCE code 520. The first data and the second data may be the same type or different types, and may include floating point values, fixed point values, cell arrays, structure arrays, simulation output data, numeric data, logical data, string data, object data, etc. Testing component 510 may receive a test case 550 to be applied to first result 530 and second result 540. For example, test case 550 may include a test (e.g., IsEqualTo) to determine whether first result 530 is equivalent to second result 540.

Testing component 510 may determine whether a comparator, of testing component 510, supports the first data and the second data. If the comparator does not support the first data and/or the second data, testing component 510 may provide (e.g., display) an indication of unsupported data in first result 530 and/or second result 540. If the comparator supports the first data and the second data, testing component 510 may utilize the comparator to select comparison logic that is appropriate for the first data of first result 530 and the second data of second result 540.

In one example implementation, the comparator may include a set (e.g., a list) of comparison logic that may be used to support different data. For example, the list may include comparison logic for cell arrays, structure arrays, numeric data, logical data, string data, object data, etc. Testing component 510 may determine first comparison logic of the list that matches the first data, and may determine second comparison logic of the list that matches the second data. The comparator may output the first comparison logic as the selected comparison logic that is appropriate for the first data of first result 530. The comparator may output the second comparison logic as the selected comparison logic that is appropriate for the second data of second result 540.

In one example, the data structures handled by the comparator may need to be compared in a numerically stable manner. Such data structures may include numerical values, such as floating point values, and values inside more complex data structures, such as cell arrays, structure arrays, output data, recursive data, etc. The comparator may provide the numerical comparison of such complex and arbitrary data structures.

Testing component 510 may compare first result 530 and second result 540, using the selected comparison logic and based on test case 550, to determine whether first result 530 is equal to second result 540. Testing component 510 may output a determination 560 of whether first result 530 is equal to second result 540. If first result 530 equals second result 540, testing component 510 may output (e.g., display) and/or store, as determination 560, diagnostic information 570 indicating the equivalence of first result 530 and second result 540. For example, as shown in FIG. 5, diagnostic information 570 may state: "The first result IsEqualTo the second result." If first result 530 does not equal second result 540, testing component 510 may output (e.g., display) and/or store, as determination 560, diagnostic information 570 indicating the nonequivalence of first result 530 and second result 540. Diagnostic information 570 may provide information identifying a location of the nonequivalence in first result 530 and/or second result 540. The location information may include a diagnostic code (e.g., a recursive path) that identifies where the nonequivalence occurs in first result 530 and/or second result 540.

In order to compare disparate data structures, typical testing systems define a method (e.g., an "equals" method) for each different data structure generated by code (e.g., TCE code 520). This may require modification of the code prior to testing. In contrast, testing component 510 may permit a different definition of equality to be used during testing than used during execution of TCE code 520. Such an arrangement may enable testing component 510 to utilize different comparison logic during the test of first result 530 and second result 540, without the need to modify TCE code 520 prior to testing. Furthermore, testing component 510 may permit first result 530 and second result 540 to be compared, while typical testing systems do not permit such a comparison. In one example implementation, testing component 510 may recursively reuse the comparison logic for many different data structures structured within complex data structures. This may prevent the comparator from having to re-implement a recursive step.

In one example implementation, the comparator may include APIs of abstract methods (e.g., satisfiedBy, getDiagnosticFor, supports, etc.). Alternatively, or additionally, the comparator may include a recursive API (e.g., ContainerComparator) and a composite API (e.g., ComparatorList) that enable testing component 510 to recursively use the comparison logic on complex data structures.

Although FIG. 5 shows example operations capable of being performed by TCE 240, in other implementations, TCE 240 may perform fewer operations, different operations, and/or additional operations than depicted in FIG. 5. Alternatively, or additionally, one or more components of FIG. 5 may perform one or more other tasks described as being performed by one or more other components of FIG. 5.

Example Testing Component Operations

Figure 6:
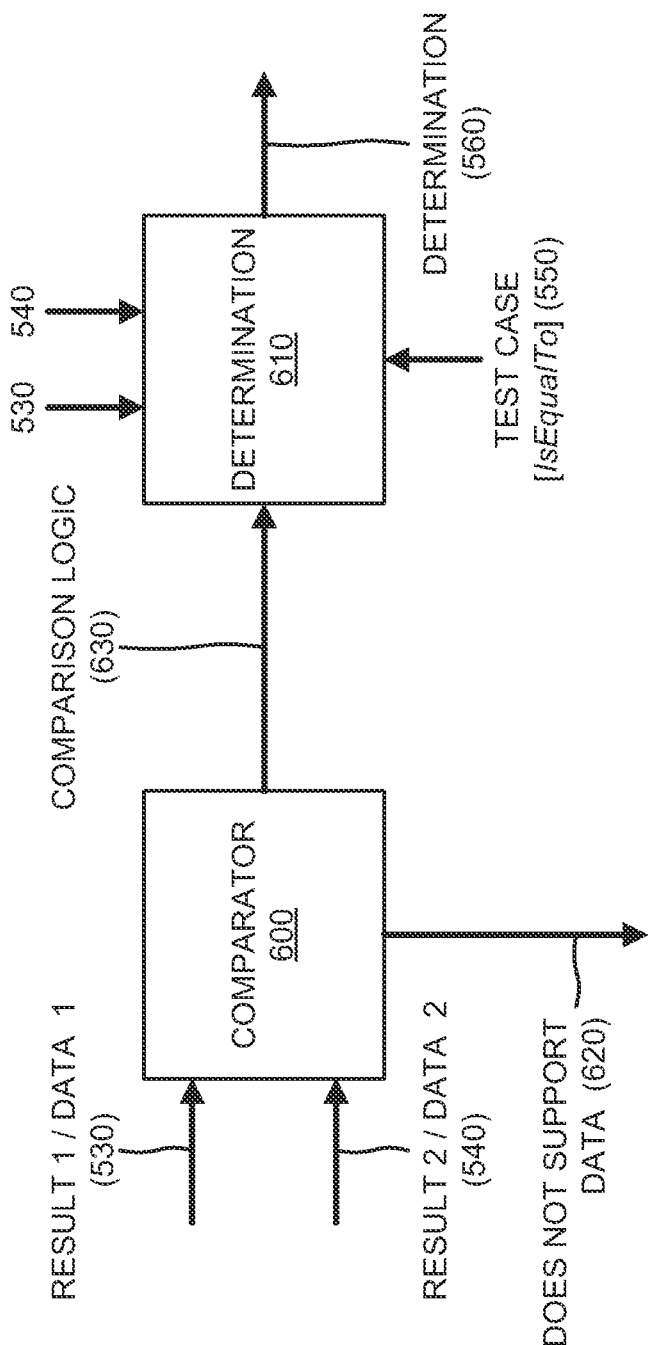
FIG. 6 is a diagram of example functional components of a testing component of the TCE.

FIG. 6 is a diagram of example functional components of testing component 510 (FIG. 5). The functions described in connection with testing component 510 may be performed by one or more components of device 300 (FIG. 3) and/or by one or more devices 300. As shown in FIG. 6, testing component 510 may include a comparator component 600 and determination component 610.

Comparator component 600 may provide an API that can be used in conjunction with a test case (e.g., an IsEqualTo constraint) and that may allow a tester to determine comparison logic to use for the test (e.g., the equality comparison provided by the IsEqualTo constraint). As shown in FIG. 6, comparator component 600 may receive first result 530 and second result 540, and may determine whether comparator component 600 supports the first data of first result 530 and the second data of second result 540.

If comparator component 600 does not support the first data of first result 530 and/or the second data of second result 540, comparator component 600 may provide (e.g., display) an indication 620 of unsupported data in first result 530 and/or second result 540. If comparator component 600 supports the first data of first result 530 and the second data of second result 540, comparator component 600 may select comparison logic 630 that is appropriate for the first data of first result 530 and the second data of second result 540. Comparator component 600 may provide comparison logic 630 to determination component 610. Comparison logic 630 may include comparison methods that may be applied to the first data of first result 530 and the second data of second result 540.

Determination component 610 may receive first result 530, second result 540, test case 550, and comparison logic 630. Determination component 610 may compare first result 530 and second result 540, using the selected comparison logic 630 and based on test case 550, to determine whether first result 530 is equal to second result 540. Determination component 610 may output determination 560 of whether first result 530 is equal to second result 540. If first result 530 equals second result 540, determination component 610 may output (e.g., display) and/or store, as determination 560, diagnostic information indicating the equivalence of first result 530 and second result 540. If first result 530 does not equal second result 540, determination component 610 may output (e.g., display) and/or store, as determination 560, diagnostic information indicating the nonequivalence of first result 530 and second result 540.

Although FIG. 6 shows example functional components of testing component 510, in other implementations, testing component 510 may include fewer functional components, different functional components, differently arranged functional components, and/or additional functional components than depicted in FIG. 6. Alternatively, or additionally, one or more functional components of testing component 510 may perform one or more other tasks described as being performed by one or more other functional components of testing component 510.

FIG. 7 is a diagram of example operations 700 capable of being performed by testing component 510. Testing component 510 may include the features described above in connection with, for example, one or more of FIGS. 1, 5, and 6. As illustrated in FIG. 7, testing component 510 may receive a first result (a) 710 and a second result (b) 720 generated by code, such as TCE code 520. In one example, first result 710 may include a first data, and second result 720 may include a second data. The first data and the second data may be the same type or different types, and may include floating point values, cell arrays, structure arrays, simulation output data, numeric data, logical data, string data, object data, etc.

As further shown in FIG. 7, testing component 510 may receive a test case 730 to be applied to first result 710 and second result 720. For example, test case 730 may include a test (e.g., testCase.assertThat) to determine whether first result 710 is equivalent to second result 720. Testing component 510 may generate a test 740 based on first result 710, second result 720, and test case 730. For example, testing component 510 may generate test 740 with the syntax testCase.assertThat(a, IsEqualTo(b, 'Using', CustomComparator)). Test 740 may determine whether first result (a) 710 is equal to second result (b) 720 using a custom comparator (e.g., CustomComparator).

Testing component 510 may determine whether the custom comparator supports the first data of first result 710 and the second data of second result 720. If the custom comparator does not support the first data and/or the second data, testing component 510 may provide (e.g., display) an indication 750 of unsupported data in first result 710 and/or second result 720. If the custom comparator supports the first data and the second data, testing component 510 may utilize the custom comparator to select comparison logic that is appropriate for the first data of first result 710 and the second data of second result 720.

Testing component 510 may compare first result 710 and second result 720, using the selected comparison logic and based on test 740, to determine whether first result 710 is equal to second result 720. If first result 710 equals second result 720, testing component 510 may output (e.g., display) and/or store information 760 (e.g., a=b) indicating the equivalence of first result 710 and second result 720. If first result 710 does not equal second result 720, testing component 510 may output (e.g., display) and/or store information 770 (e.g., a≠b) indicating the nonequivalence of first result 710 and second result 720.

Although FIG. 7 shows example operations capable of being performed by testing component 510, in other implementations, testing component 510 may perform fewer operations, different operations, and/or additional operations than depicted in FIG. 7. Alternatively, or additionally, one or more components of FIG. 7 may perform one or more other tasks described as being performed by one or more other components of FIG. 7.

FIG. 8 is a diagram of example operations 800 capable of being performed by comparator component 600. Comparator component 600 may include the features described above in connection with, for example, one or more of FIGS. 1 and 5-7. As shown in FIG. 8, comparator component 600 may include a comparator list 810 with multiple comparison logic 830. In one example, comparison logic 830 of comparator list 810 may handle several different data structures received by testing component 510 for testing. For example, comparator list 810 may include comparison logic 830 for cell arrays (e.g., CellComparator), comparison logic 830 for structure arrays (e.g., StructComparator), comparison logic 830 for numeric data (e.g., NumericComparator), comparison logic 830 for logical data (e.g., LogicalComparator), comparison logic 830 for string data (e.g., StringComparator), comparison logic 830 for object data (e.g., ObjectComparator), etc.

In one example implementation, comparator component 600 may receive a result that includes particular data, and may determine whether comparator list 810 includes comparison logic 830 that supports the particular data. If comparator list 810 includes comparison logic 830 that supports the particular data, comparator component 600 may select the first comparison logic 830, from comparator list 810, which supports the particular data. Alternatively, or additionally, if comparator list 810 includes multiple comparison logic 830 that supports the particular data, comparator component 600 may select one of the multiple comparison logic 830 from comparator list 810.

Some data structures, such as cell arrays and structure arrays, may contain arbitrarily complex elements that also need to be compared. For such data structures, comparator 600 may recursively select comparison logic 830, from comparator list 810, for the different complex elements. For example, as shown in FIG. 8, comparator 600 may receive a result 820 that includes the syntax data={5, 'string', inputParser}. Comparator 600 may determine that data is a cell array, and may select comparison logic 830 for cell arrays (e.g., CellComparator). Comparator 600 may examine each element of the data cell array, and may determine that a first element (e.g., '5') is a double value. Since comparison logic 830 for cell arrays (e.g., CellComparator) and comparison logic 830 for structure arrays (e.g., StructComparator) do not support double values, comparator 600 may select, for the first element, comparison logic 830 for numeric data (e.g., NumericComparator). Comparator 600 may determine that a second element (e.g., string) is string data, and may select, for the second element, comparison logic 830 for string data (e.g., StringComparator). Comparator 600 may determine that a third element (e.g., inputParser) is object data, and may select, for the third element, comparison logic 830 for object data (e.g., ObjectComparator).

Although result 820 may include a simple data structure, comparator 600 may permit comparison, using appropriate comparison logic 830, of data structures that may be significantly more complex with multiple levels of nesting. Furthermore, comparator 600 may ensure that numeric and/or non-numeric values are compared with appropriate tolerances, and that the tolerances propagate to all numeric and/or non-numeric values in a data structure. Alternatively, or additionally, comparator 600 may apply modifiers to comparisons for non-numeric data types. For example, comparator 600 may compare strings without regard to whitespace or case differences, may compare numeric values without regard to class (type) differences, etc. The modifiers may be propagated to appropriate values in a data structure.

In one example implementation, comparator list 810 may correspond to a list (e.g., the ComparatorList) of comparison logic 830 that may be selected for a comparison operation. The ComparatorList may provide the list of comparison logic 830 to comparator component 600 (e.g., the ContainerComparator) before the ContainerComparator performs the comparison operation. The ContainerComparator may then have access to the full list of comparison logic 830 and may therefore compare any data supported by the ComparatorList. The ContainerComparator may support, in recursion, any data that is support the ComparatorList.

Although FIG. 8 shows example operations capable of being performed by comparator component 600, in other implementations, comparator component 600 may perform fewer operations, different operations, and/or additional operations than depicted in FIG. 8. Alternatively, or additionally, one or more components of FIG. 8 may perform one or more other tasks described as being performed by one or more other components of FIG. 8.

Example Process

FIGS. 9 and 10 are flow charts of an example process 900 for comparing disparate data in arbitrarily complex data structures. In one implementation, process 900 may be performed by client device 210/TCE 240. Alternatively, or additionally, process 900 may be performed by another device or a group of devices separate from or including client device 210/TCE 240, such as server device 220.

As shown in FIG. 9, process 900 may include receiving a first result that includes first data (block 910), and receiving a second result that includes second data (block 920). For example, in an implementation described above in connection with FIG. 5, testing component 510 may receive results generated by TCE code 520. TCE code 520 may be executed to generate first result 530 that includes first data. TCE code 520 may again be executed to generate second result 540 that includes second data. In one example, first result 530 may be generated by a simulation version of TCE code 520, and second result 540 may be generated by an executable version of TCE code 520. The first data and the second data may be the same type or different types, and may include floating point values, cell arrays, structure arrays, simulation output data, numeric data, logical data, string data, object data, etc.

As further shown in FIG. 9, process 900 may include determining whether a comparator supports the first data and the second data (block 930). If the comparator does not support the first data and/or the second data (block 930—NO), process 900 may include providing an indication of unsupported data (block 940). For example, in an implementation described above in connection with FIG. 5, testing component 510 may determine whether a comparator, of testing component 510, supports the first data and the second data. If the comparator does not support the first data and/or the second data, testing component 510 may provide (e.g., display) an indication of unsupported data in first result 530 and/or second result 540.

Returning to FIG. 9, if the comparator supports the first data and the second data (block 930—YES), process 900 may include utilizing the comparator to select comparison logic for the first result and the second result (block 950), and comparing the first result and the second result, with the comparison logic, to determine if the first result is equal or unequal to the second result (block 960). For example, in an implementation described above in connection with FIG. 5, if the comparator supports the first data and the second data, testing component 510 may utilize the comparator to select comparison logic that is appropriate for the first data of first result 530 and the second data of second result 540. Testing component 510 may compare first result 530 and second result 540, using the selected comparison logic and based on test case 550, to determine whether first result 530 is equal to second result 540.

As further shown in FIG. 9, process 900 may include outputting and/or storing the determination of equality or inequality (block 970). For example, in an implementation described above in connection with FIG. 5, testing component 510 may output determination 560 of whether first result 530 is equal to second result 540. If first result 530 equals second result 540, testing component 510 may output (e.g., display) and/or store, as determination 560, diagnostic information 570 indicating the equivalence of first result 530 and second result 540. If first result 530 does not equal second result 540, testing component 510 may output (e.g., display) and/or store, as determination 560, diagnostic information 570 indicating the nonequivalence of first result 530 and second result 540.

Process block 950 may include the process blocks depicted in FIG. 10. As shown in FIG. 10, process block 950 may include determining first comparison logic, of a comparator list, that matches the first data (block 1000), determining second comparison logic, of the comparator list, that matches the second data (block 1010), and outputting the first comparison logic and the second comparison logic as the selected comparison logic for the first result and the second result (block 1020). For example, in an implementation described above in connection with FIG. 5, the comparator may include a list of comparison logic for cell arrays, structure arrays, numeric data, logical data, string data, object data, etc. Testing component 510 may determine first comparison logic of the list that matches the first data, and may determine second comparison logic of the list that matches the second data. The comparator may output the first comparison logic as the selected comparison logic that is appropriate for the first data of first result 530. The comparator may output the second comparison logic as the selected comparison logic that is appropriate for the second data of second result 540.

CONCLUSION

Systems and/or methods described herein may compare disparate data in arbitrarily complex data structures in order to determine whether the data structures are equivalent (e.g., pass or fail a qualification test). In one example, the systems and/or methods may provide a comparator API that enables a tester of program code to compare complex data structures (e.g., cell arrays, structure arrays, etc.). The data structures may include many different types of data and each data type may require different methods of comparison. The single comparator API may recursively compare all elements of a data structure so that each element may utilize comparison logic that is appropriate for that element.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 9 and 10, the blocks and/or the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
one or more processors to:
receive a first result generated by code,
the first result including first data,
receive a second result generated by the code,
the second result including second data,
determine whether a comparator supports the first data and the second data,
utilize, if the comparator supports the first data and the second data, the comparator to select comparison logic for the first data of the first result and for the second data of the second result,
compare, if the comparator supports the first data and the second data, the first result and the second result, using the selected comparison logic, to obtain a determination of whether the first result is equivalent to the second result,
output or store, if the comparator supports the first data and the second data, the determination of whether the first result is equivalent to the second result; and
provide an indication of unsupported data if the comparator does not support the first data or the second data.

2. The device of claim 1, where, when utilizing the comparator, the one or more processors are further to:
determine first comparison logic of a list, of the comparator, that matches the first data,
determine second comparison logic of the list that matches the second data, and output the first comparison logic and the second comparison logic as the selected comparison logic for the first data of the first result and for the second data of the second result, respectively.

3. The device of claim 1, where each of the first data and the second data include one or more of:
   a floating point value,
   a cell array,
   a structure array,
   simulation output data,
   numeric data,
   logical data,
   string data, or
   object data.

4. The device of claim 1, where the selected comparison logic includes one or more of:
   comparison logic for floating or fixed point values,
   comparison logic for cell arrays,
   comparison logic for structure arrays,
   comparison logic for simulation output data,
   comparison logic for numeric data,
   comparison logic for logical data,
   comparison logic for string data, or
   comparison logic for object data.

5. The device of claim 1,
   where the first result includes multiple data, and
   where the one or more processors are further to:
      utilize the comparator recursively to select multiple comparison logic for the multiple data of the first result.

6. The device of claim 1,
   where the second result includes multiple data, and
   where the one or more processors are further to:
      utilize the comparator recursively to select multiple comparison logic for the multiple data of the second result.

7. A method, comprising:
   receiving a first result generated by code,
      the first result including first data, and
      the receiving the first result being performed by one or more devices;
   receiving a second result generated by the code,
      the second result including second data, and
      the receiving the second result being performed by the one or more devices;
   determining whether a comparator supports the first data and the second data,
      the determining being performed by the one or more devices;
   utilizing, if the comparator supports the first data and the second data, the comparator to select comparison logic for the first data of the first result and for the second data of the second result,
      the utilizing the comparator being performed by the one or more devices if the comparator supports the first data and the second data;
   comparing, if the comparator supports the first data and the second data, the first result and the second result, using the selected comparison logic, to obtain a determination of whether the first result is equivalent to the second result,
      the comparing the first result and the second result being performed by the one or more devices if the comparator supports the first data and the second data; and
   outputting or storing, if the comparator supports the first data and the second data, the determination of whether the first result is equivalent to the second result,
      the outputting or storing the determination being performed by the one or more devices if the comparator supports the first data and the second data; and
   providing an indication of unsupported data if the comparator does not support the first data or the second data,
      the providing the indication being performed by the one or more devices if the comparator does not support the first data and the second data.

8. The method of claim 7, where utilizing the comparator further comprises:
   determining first comparison logic of a list, of the comparator, that matches the first data;
   determining second comparison logic of the list that matches the second data; and
   outputting the first comparison logic and the second comparison logic as the selected comparison logic for the first data of the first result and for the second data of the second result, respectively.

9. The method of claim 7, where each of the first data and the second data include one or more of:
   a floating point value,
   a cell array,
   a structure array,
   simulation output data,
   numeric data,
   logical data,
   string data, or
   object data.

10. The method of claim 7, where the selected comparison logic includes one or more of:
    comparison logic for floating or fixed point values,
    comparison logic for cell arrays,
    comparison logic for structure arrays,
    comparison logic for simulation output data,
    comparison logic for numeric data,
    comparison logic for logical data,
    comparison logic for string data, or
    comparison logic for object data.

11. The method of claim 7,
    where the first result includes multiple data, and
    where the method further comprises:
       utilizing the comparator recursively to select multiple comparison logic for the multiple data of the first result.

12. The method of claim 7,
    where the second result includes multiple data, and
    where the method further comprises:
       utilizing the comparator recursively to select multiple comparison logic for the multiple data of the second result.

13. The method of claim 7, further comprising:
    receiving a test case to be applied to the first result and the second result,
       the test case specifying a test to obtain the determination of whether the first result is equivalent to the second result, and
       the comparing being performed based on the test case.

14. One or more non-transitory computer-readable media storing instructions, the instructions comprising:
    one or more instructions that, when executed by a processor of a device, cause the processor to:
       receive a first result generated by code,
          the first result including first data,
       receive a second result generated by the code,
          the second result including second data,
       determine whether a comparator supports the first data and the second data, provide an indication of unsupported data when the comparator does not support the first data or the second data, utilize, if the comparator supports the first data and the second data, the comparator to select comparison logic for the first data of the first result and for the second data of the second result, compare, if the comparator supports the first data and the second data, the first result and the second result, using the selected comparison logic, to obtain a determination of whether the first result is equivalent to the second result, output or store, if the comparator supports the first data and the second data, the determination of whether the first result is equivalent to the second result, and provide an indication of unsupported data if the comparator does not support the first data or the second data.

15. The one or more non-transitory computer-readable media of claim 14, where the instructions further comprise:

one or more instructions that, when executed by the processor, cause the processor to:

determine first comparison logic of a list, of the comparator, that matches the first data, determine second comparison logic of the list that matches the second data, and output the first comparison logic and the second comparison logic as the selected comparison logic for the first data of the first result and for the second data of the second result, respectively.

16. The one or more non-transitory computer-readable media of claim 14, where each of the first data and the second data include one or more of:

a floating point value,
a cell array,
a structure array,
simulation output data,
numeric data,
logical data,
string data, or
object data.

17. The one or more non-transitory computer-readable media of claim 14, where the selected comparison logic includes one or more of:

comparison logic for floating or fixed point values,
comparison logic for cell arrays,
comparison logic for structure arrays,
comparison logic for simulation output data,
comparison logic for numeric data,
comparison logic for logical data,
comparison logic for string data, or
comparison logic for object data.

18. The one or more non-transitory computer-readable media of claim 14, where the first result includes multiple data, and
where the instructions further comprise:
one or more instructions that, when executed by the processor, cause the processor to:
utilize the comparator recursively to select multiple comparison logic for the multiple data of the first result.

19. The one or more non-transitory computer-readable media of claim 14, where the second result includes multiple data, and
where the instructions further comprise:
one or more instructions that, when executed by the processor, cause the processor to:
utilize the comparator recursively to select multiple comparison logic for the multiple data of the second result.

20. The one or more non-transitory computer-readable media of claim 14, where the first data is of a first type,
where the second data is of a second type, and
where the second type is different from the first type.

* * * * *